US006819631B2

(12) United States Patent
Pearce

(10) Patent No.: US 6,819,631 B2
(45) Date of Patent: Nov. 16, 2004

(54) METHOD AND APPARATUS FOR A NON-OIL-FILLED TOWED ARRAY WITH A NOVEL HYDROPHONE DESIGN AND UNIFORM BUOYANCY TECHNIQUE

(75) Inventor: Richard Pearce, Austin, TX (US)

(73) Assignee: Input/Output, Inc., Stafford, TX (US)

( * ) Notice: Subject to any disclaimer, the term of this patent is extended or adjusted under 35 U.S.C. 154(b) by 0 days.

(21) Appl. No.: 10/325,640

(22) Filed: Dec. 20, 2002

(65) Prior Publication Data

US 2003/0174583 A1 Sep. 18, 2003

Related U.S. Application Data

(63) Continuation of application No. 09/635,031, filed on Aug. 4, 2000, now Pat. No. 6,498,769.

(51) Int. Cl.[7] .................................................. H04R 1/02
(52) U.S. Cl. ...................................................... 367/188
(58) Field of Search ................................ 367/188, 173, 367/165, 163, 154, 174

(56) References Cited

U.S. PATENT DOCUMENTS 6,498,769 B1 * 12/2002 Pearce ........................ 367/188

* cited by examiner

Primary Examiner—Daniel Pihulic
(74) Attorney, Agent, or Firm—Madan, Mossman & Sriram, P.C.

(57) ABSTRACT

A structure and method for constructing a non-oil-filled towed array providing a single cable entry point for each channel regardless of the number of hydrophones used to make up a hydrophone group or array is described. The method and apparatus enables uniform buoyancy of the hydrophone array and the primary cable around which the hydrophone array is wound. Uniform buoyancy is achieved through the addition of hollow micro-spheres into a Reaction Injection Molded (RIM) polyurethane material used to mold the hydrophones. Additional buoyancy may be desired adjacent heavier cable sections where connectors and telemetry modules are located. An embodiment enables precise adjustment of hydrophone cable buoyancy by providing precise adjustment of the concentration of hollow glass micro-spheres in areas where more or less buoyancy is desired.

24 Claims, 4 Drawing Sheets

METHOD AND APPARATUS FOR A NON-OIL-FILLED TOWED ARRAY WITH A NOVEL HYDROPHONE DESIGN AND UNIFORM BUOYANCY TECHNIQUE

CROSS-REFERENCE TO RELATED APPLICATIONS

This application is a continuation of U.S. patent application Ser. No. 09/635,031 filed on Aug. 4, 2000, now U.S. Pat. No. 6,498,769.

BACKGROUND OF THE INVENTION

1. Field of the Invention

The present invention relates to a system and method for hydrophones for sensing acoustic pressure waves. In particular the invention relates to a technique for obtaining uniform buoyancy and increased sensitivity utilizing a hollow microsphere loaded reaction injection molding polyurethane material.

2. Description of the Related Art

Current methods of constructing non-oil-filled or solid towed arrays have proven to be prohibitively expensive and complex due to their method of construction, which adversely affects reliability. Such techniques are described in U.S. Pat. Nos. 5,774,423; 5,361,240; 5,883,857; and 4,733,378. As a result, solid towed arrays, while demonstrating substantial advantages over oil filled arrays, have met with limited acceptance within the seismic and surveillance communities due to their high price and unreliability. Thus there is a need for a technology which addresses the primary causes of high cost and low reliability with a unique method of construction that eliminates the primary cause of failure and reduces the labor required to construct the array.

The primary cause of failure of solid towed arrays results from the requirement to make electrical connections for each of the numerous hydrophones that make up a single channel in an array. In the case of the cable described in U.S. Pat. No. 5,883,857, the method of construction calls for a discrete entry into the primary cable in order to connect each hydrophone. Prior methods of construction have utilized a "floatation" cable design that extrudes a buoyant material, such as foamed polyethylene, over an inner jacketed cable, which is then covered with an outer extrusion of polyurethane. The primary problem with this design is the fact that there is no bond between the polyethylene foam and both the inner and outer jackets since they are dissimilar materials. This procedure results in an effective path way between the unbonded dissimilar materials enabling water to migrate up and down the length of the cable in the path way when the outer protective shield of the cable is damaged or a leak occurs relative to the point of cable entry where the hydrophones are attached. Attempted solutions to this problem have proven to be unreliable.

Thus, there is a need for a method of constructing a solid or non-oil-filled hydrophone which does not enable formation of a path way for water to migrate up and down the length of the cable when the outer protective cable shield is damaged or a leak otherwise occurs and which provides a cost effective method and apparatus for a solid hydrophone.

SUMMARY OF THE INVENTION

Embodiments of non-oil-filled arrays, and embodiments of equipment and methods of forming non-oil-filled arrays, are described herein. An embodiment of an array provides minimization of cable entry points to one entry point for each channel irregardless of the number of hydrophones used to make up a hydrophone group or array. An embodiment also provides vastly superior protection of the primary cable bundle from damage over present known methods.

In an embodiment, the hydrophone array is provided with uniform buoyancy. Uniform buoyancy is achieved through the use of a hollow micro-sphere loaded Reaction Injection Molded (RIM) polyurethane material. Prior designs have relied on foaming in order incorporate air bubbles into molded areas in the hydrophone and hydrophone cable to achieve buoyancy. The result of prior methods, however, has been a significant variation in the amount of buoyancy achieved. Prior methods have been unable to precisely control the amount of buoyancy in areas of the cable where additional buoyancy is desired. For example, additional buoyancy is desired adjacent the approach to heavier sections of the hydrophone cable where connectors and in the case of digital arrays, the telemetry modules are located.

In one embodiment, a method enables precise adjustment of hydrophone cable buoyancy by providing precise adjustment of the concentration of hollow glass micro-spheres in areas where more or less buoyancy is desired. Use of an Reaction Injection Molding (RIM) process, results in significant reductions in cost and time in the construction of solid towed arrays. The RIM material enables use of a softer, lower durometer matrix in which the micro-spheres reside resulting in a hydrophone cable that is more flexibility than prior known construction methods. For example, the prior known methods provide a minimum bending radius of 6 feet, whereas an embodiment of the method and apparatus provides a minimum bending radius of 18 inches.

An embodiment also provides greater protection of the interior hydrophone cable due to the homogeneous nature of the RIM material (which eliminates the necessity of layering of dissimilar materials and the creation of potential path ways for water to run up and down the hydrophone cable as discussed above) which carries hydrophone signals and array telemetry, resulting in an improvement in the reliability of the system and greater immunity from damage due to abrasions or damage from other sources, for example, shark bite.

DETAILED DESCRIPTION OF A PREFERRED EMBODIMENT

An embodiment of a hydrophone provides a polymer film, air backed bender design, that unlike previous designs will not reduce the circumferential length of the polymer film with an increase in hydrostatic pressure. In certain embodiments, a method and apparatus provides a polymer hydrophone that exhibits minimal change in sensitivity with depth change and provides a substantially unlimited crush depth.

Figure 1:
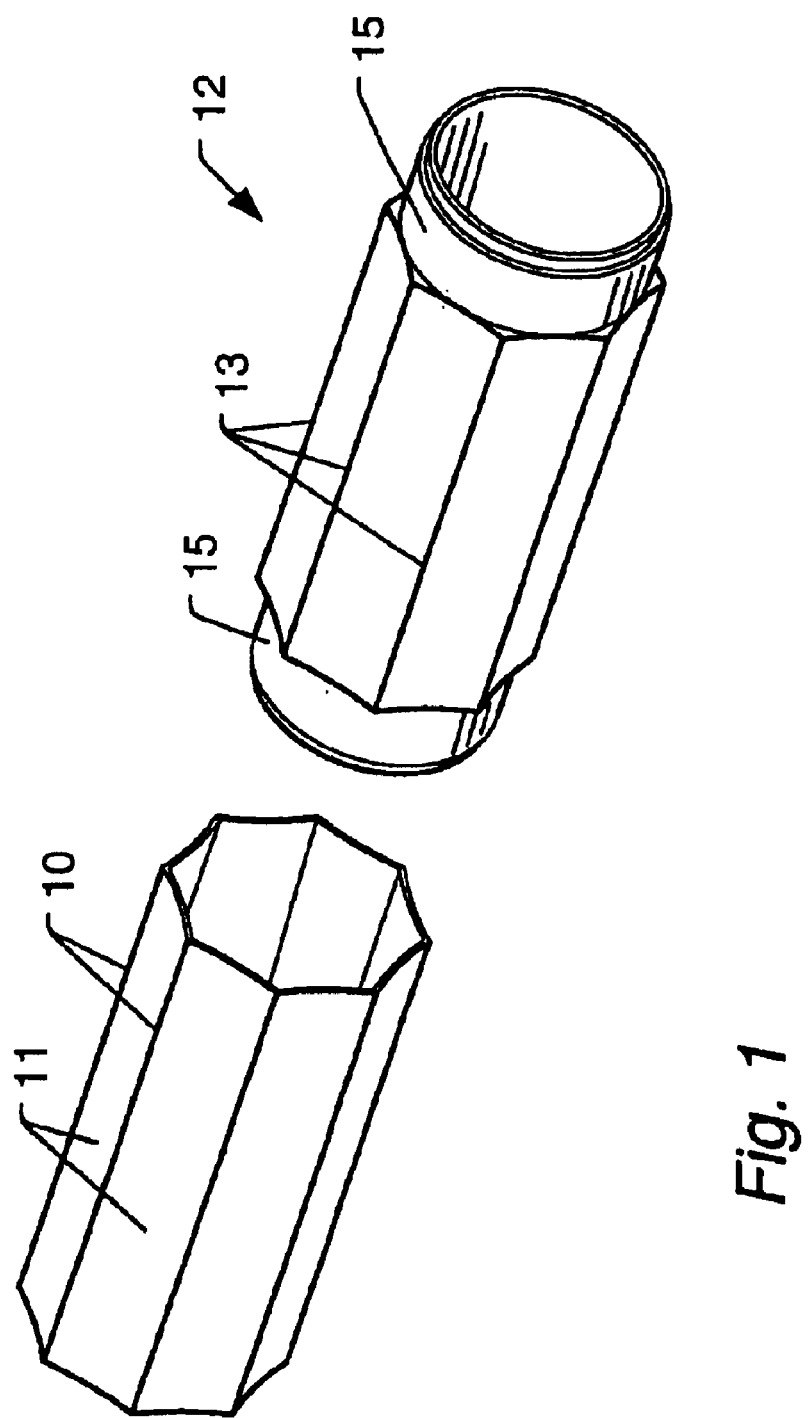
FIG. 1 is an illustration of the flexible diaphragm and rigid back plane of the present invention.

Turning now to FIG. 1, an embodiment of diaphragm 10 and back plane 12 are illustrated. Diaphragm 10 slides over back plane 12. Minimal sensitivity to depth change and substantially unlimited crush depth are provided by a design comprising the hydrophone diaphragm 10 having a series of concave faces 11 that run longitudinally along the length of the hydrophone diaphragm 10 and discretely around the circumference of the hydrophone diaphragm 12. In the example of FIG. 1, the eight concave surfaces of diaphragm 10 occupy the eight octants around the circumference of back plane 12. Each of the concave surfaces 11 forms a discrete hydrophone bender element using one section of a continuous piece of piezo film 20, shown in FIG. 5.

Figure 2:
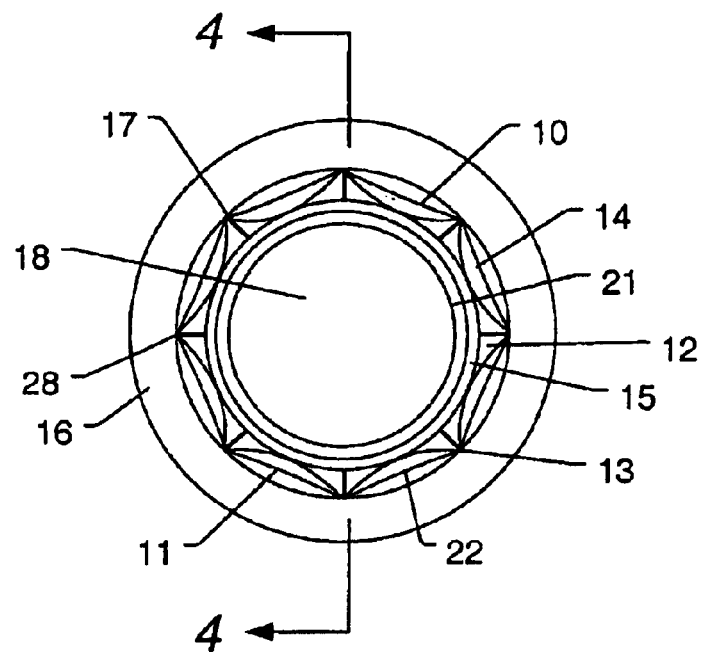
FIG. 2 is a cross-sectional view of the hydrophone of the present invention showing the matching of the silver ink patterns with the concave portions of the diaphragm.

The back plane 12 of the hydrophone is molded onto a rigid tubular member shown in FIG. 2, in such a manner as to create a cylindrical surface 15 at each end of the back plane. The back plan is provided with longitudinal ridges 13 residing upon the rigid tubular member 21, shown in FIG. 2. The molded back plane fits into the shape of the diaphragm 10 to form a surface against which the flexible diaphragm 10 stops when sufficient hydrostatic pressure is applied. Stopping against the back plane enables stretching under hydrostatic pressure without stretching the film beyond its yield point. Mounting of the flexible diaphragm 10 onto back plane 12 is illustrated in FIG. 2.

Figure 4:
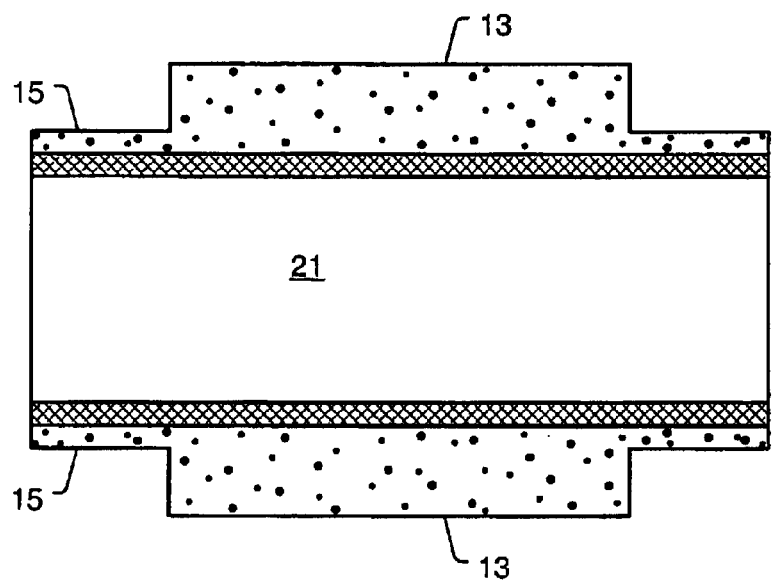
FIG. 4 illustrates a cross-sectional representation of the rigid tube and molded plastic back plane taken substantially along line 4—4 of FIG. 2.

Turning now to FIG. 2, a cross section of an embodiment of a hydrophone is illustrated. As shown in FIG. 2, diaphragm 10 slides over back plane 12 and back plane ridges 13. Air voids 14 are formed between diaphragm 10 and back plane cylindrical portion 15 and back plane ridges 13. Hydrophone cable orifice 18 is surrounded by rigid tube 21. Rigid back plane 12, shown in FIG. 1, resides on top of rigid tube 21. The entire structure is surrounded with molding 16. FIG. 4 illustrate a cross-sectional view of rigid tube 21 and molded back plane 12 having cylindrical portion 15 and ridges 13.

Figure 5:
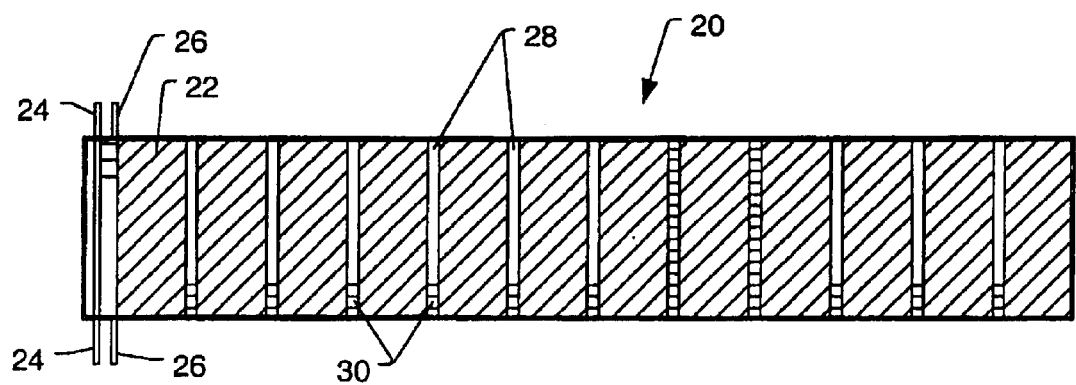
FIG. 5 a schematic representation of the piezo thin film element with pass through construction of the present invention.

Turning now to FIG. 5, a thin film homo-polymer piezo element 20 is constructed to enable wires to be connected to two sides of the film 20 with a flexible conductive ink 22 applied to both sides of the polymer to form the piezo element 20. The front side of piezo element 20 is visible in FIG. 5. The back side of piezo element 20 looks substantially similar to the front side and is not shown. The front side of piezo element 20 is coated with a conductive silver ink pattern 22, which is connected to outside pins 24. The back side of piezo element 20 is coated with a similar silver ink pattern and is connected to inside pins 26. This construction technique enables multiple piezo elements to be connected together in either a series or parallel configuration without the necessity of wires to pass the signal across the piezo element 20. The silver ink pattern sections 22 are interspersed with voids 28. Connectivity across voids 28 between adjacent silver ink sections 22 on the front side of piezo element 20 is provided by metallic traces 30. Similarly, connectivity across voids 28 between adjacent silver ink sections 22 on the back side of piezo element 20 is provided by metallic traces 30.

As shown in FIG. 2, voids 28 are positioned on top of and aligned with back plane ridges 13 and silver ink portions 22 coincide with diaphragm concave portions 11. This alignment provides for deformation of concave diaphragm portions 11 and silver ink sections 22 between ridges 13. The arrangement of FIG. 2 reduces the effect of passive capacitance contributions from ridge supported voids areas 28 of the piezo element that are not deformed by incident vibration. The piezo element 20 is bonded to the concave diaphragm 10 with a transfer adhesive such as 3M-VHB using a press with a face having the same shape as concave surface 11 of diaphragm 10 upon which the material 20 is adhered.

As shown in FIG. 2, back plane 12 provides ridges 13 running longitudinally down the length of the hydrophone, forming a series of standoffs that fit into the high points 17 of the diaphragm formed at the joining edges of or space between adjacent concave surfaces 11. This construction serves to lock the high points 17 in place on back plane ridges 13 and results in substantially all deformation of the film due to dynamic pressure variation (sound) occurring between these fixed points at high point 17 which is coincident with void 28. The cumulative change in length of the piezo film in some embodiments is greater than that of a simple cylinder resulting in improved sensitivity of the hydrophone for a given signal pressure level.

Figure 3:
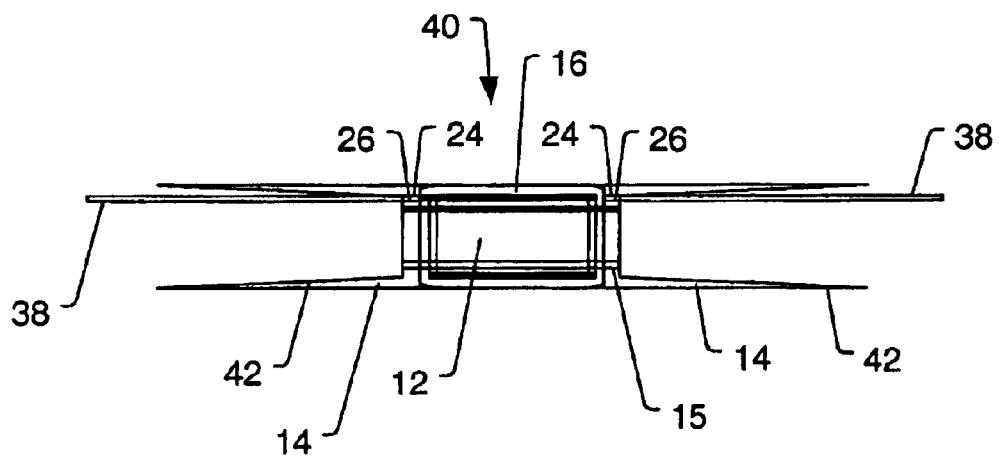
FIG. 3 is a side view of the preferred hydrophone of the present invention prior to mounting the hydrophone on the cable.

There are two methods of embodying the hydrophone for mounting on the cable. As shown in FIG. 3, the outer covering for the hydrophone consists of a cylindrical sleeve 16, one end of which has an end that is of the same diameter as the back plane and another end that is of a larger diameter to allow for the insertion of the back plane/diaphragm/film assembly. Once the back plane/diaphragm/film assembly is inserted and wire connections made between pins 24, 26 and twisted pair 38, the space between the back plane/diaphragm/film assembly and the inner wall of the outer sleeve 16 is filled with a suitable potting material. The hydrophone assembly 40 now has a single twisted pair of wires 38 entering one end of the hydrophone assembly and exiting the other end of the hydrophone assembly. Back plane 12 is molded from a material that is bondably compatible with the material that is used to form the outer covering of the hydrophone.

Cylindrical portion 15 of the back plane 12 extends beyond the length of the sleeve to enable injection molding of end caps 14 on the hydrophone, sealing the hydrophone and the cable entry points. In the case of this example the molding step also is used to form two oppositely located "cups" 42, as shown in FIG. 3 on each end of the hydrophone. The cups have an outer diameter equal to the maximum diameter of the outer sleeve 16 formed on the ends of hydrophone segments 40.

Figure 7:
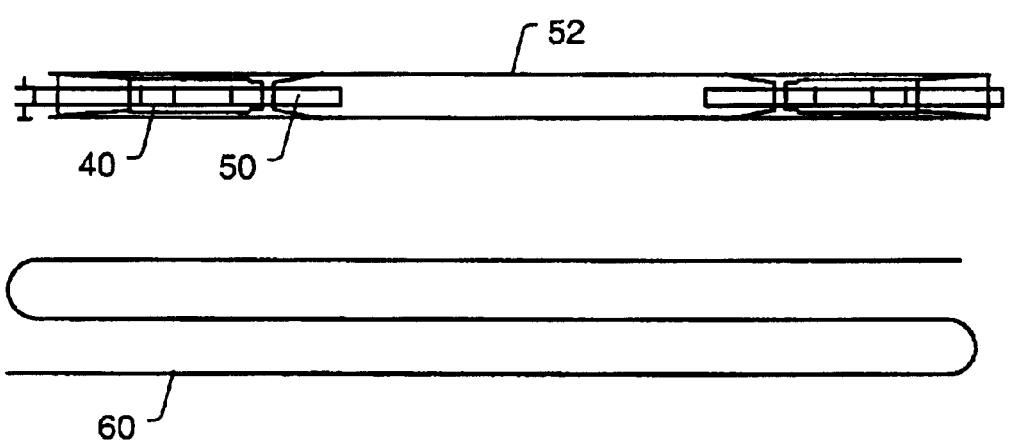
FIG. 7 is a schematic representation of the molding of the hydrophone onto a hydrophone cable which is then helically wound onto a primary cable.

As shown in FIG. 7, after locating hydrophone assemblies 40 in the desired locations along a primary cable 50, buoyant material 52 is injected along the length of the cable between the hydrophones and inside the cups to which the material bonds. The resulting assembly forms a constant diameter non-oil-filled towed array of significantly reduced diameter. The buoyancy of the hydrophone cable and the primary cable around which the hydrophone cable is helically wrapped, can be selectively controlled to increase or decrease the desired buoyancy at a desired point along the hydrophone cable length, within the hydrophones or within the hydrophone cups by increasing or decreasing the hollow microsphere concentration accordingly. In an embodiment using RIM, a folia material is used in molding the hydrophone cups and forms a bondable interface between the RIM materials used in the forming the hydrophone cups and the overmolding of the hydrophone cable.

An alternative embodiment provides for use of RIM material, without hollow microspheres, to produce the molded hydrophone structure described above and indicated in the FIGS. 1–7. Use of RIM material produces a lower cost hydrophone embodiment compared to the first method and is accomplished with a single injection of RIM material.

As shown in FIG. 7, in certain embodiments, hydrophones are constructed along a single strain relieved twisted pair cable 50 of relatively small diameter. Each hydrophone 40 is molded to enable longitudinal pass-through of the cable 50 to attached subsequent hydrophones within a group. The length of the cable 50 between hydrophones is sufficient to enable winding the cable 50 helically around a primary cable bundle 60, providing strain relief during deformation of the cable while towing. A single entry point into the primary cable is made at the head of the hydrophone group where appropriate electrical connections are made between signal conductors in the primary cable and the twisted pair from the hydrophone group. The connections are made using standard take-out methods.

Substantially uniform neutral buoyancy of the entire primary cable section is accomplished with a syntactic Reaction Injection Molded material that provides high flexibility and consistent buoyancy that will not be reduced by over-pressurization. Control of the hollow sphere concentration during Reaction Injection Molding of the hydrophone, associated hydrophone cable and primary cable is provided by a "Mode Quad Sure Shot 150" available from Hi Tech Engineering, Grand Rapids, Mich.

Figure 6:
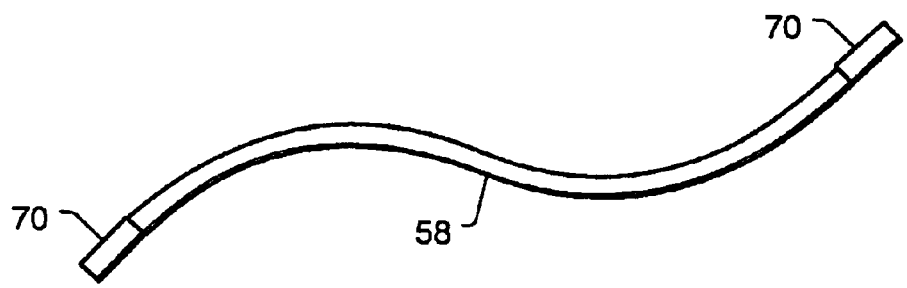
FIG. 6 is an illustration of a cable having connector at both ends for connection hydrophone sections together or connecting hydrophone sections to a transmission device such as a digital or analog telemetry model.

As shown in FIG. 6, in certain embodiments, a connector 70 can be attached on the end of each hydrophone section 58 to enable connecting the hydrophone sections together or connecting a hydrophone section or sections to a transmission device such as a digital or analog telemetry module. Additional microspheres are added to the cable to increase buoyancy at each end of the hydrophone section to compensate for the additional weight of the connectors at the ends, thereby maintaining neutral buoyancy along the entire length of the section.

The foregoing description is intended as an example of a preferred embodiment and not intended to limit the scope of the invention, which is defined by the following claims.

What is claimed is:

1. A solid towed bender hydrophone comprising: a diaphragm having a tubular shape; a thin film piezo element attached to the diaphragm; and a back plane having a cylindrical shape, further comprising at least one longitudinal rib on the exterior surface of the back plane wherein the back plane and the at least one rib slide into the center of and slidably engage the tubular diaphragm.

2. The apparatus of claim 1 wherein the diaphragm further comprises a plurality of discrete concave surfaces running longitudinally along the diaphragm wherein the at least one rib acts as an offset between the back plane and the diaphragm, each concave surface using a section of the piezo film to form a discrete hydrophone bender element.

3. The apparatus of claim 2 wherein the back plane and at least one rib are molded onto a rigid tubular member.

4. The apparatus of claim 2 wherein the back plane has a tubular shape having a hollow center through which a hydrophone cable passes.

5. The apparatus of claim 1 wherein the continuous film piezo element has a front and back side and is constructed so that a wire can be connected each side of the film with a flexible conductive ink.

6. The apparatus of claim 2 wherein the thin film piezo element further comprises a conductive ink pattern on each side of the film, wherein the pattern comprises a plurality of ink sections interspersed with voids, wherein ink patterns adjacent a void are connected with a conductive strip across a void between adjacent ink patterns.

7. The apparatus of claim 6 further comprising a set of pins attached to the front ink patterns and a set of pins attached to the back ink patterns which enable connecting a plurality of hydrophones in series or parallel.

8. The apparatus of claim 6 wherein the voids are positioned coincident with the back plane ribs.

9. The apparatus of claim 8 further comprising a reaction injection molding covering.

10. The apparatus of claim 9 further comprising a molding cup formed on each end of the apparatus for receiving a hydrophone cable.

11. The apparatus of claim 10 further comprising a plurality of hydrophones physically attached end to end and wound helically around a primary cable.

12. The apparatus of claim 11 wherein the plurality of hydrophones provide a single attachment point to the primary cable.

13. A method for making a solid towed bender hydrophone comprising the steps of: providing a diaphragm having a tubular shape; providing a thin film piezo element attached to the diaphragm; and providing a back plane having a cylindrical shape, further comprising at least one longitudinal rib on the exterior surface of the back plane wherein the back plane and the at least one rib slide into the center of and slidably engage the tubular diaphragm.

14. The method of claim 13 wherein the diaphragm further comprises a plurality of discrete concave surfaces running longitudinally along the diaphragm wherein the at least one rib acts as an offset between the back plane and the diaphragm, each concave surface using a section of the piezo film to form a discrete hydrophone bender element.

15. The apparatus of claim 14 further comprising the step of molding the back plane and at least one rib onto a rigid tubular member.

16. The apparatus of claim 14 wherein the back plane has a tubular shape having a hollow center through which a hydrophone cable passes.

17. The apparatus of claim 13 further comprising the step of:

connecting a wire to a back side of the film with a flexible conductive ink and connecting a wire to the front side of the film with a flexible conductive ink.

18. The method of claim 14 further comprising the step of: placing a conductive ink pattern on each side of the film, wherein the pattern comprises a plurality of ink sections interspersed with voids; and connecting the ink patterns adjacent a void with a conductive strip across a void between adjacent ink patterns.

19. The method of claim 18 further comprising step of: connecting a set of pins to the front side ink patterns; connecting a set of pins to the back side ink patterns, thereby enabling connection of a plurality of hydrophones in series or parallel.

20. The apparatus of claim 18 further comprising the step of:

positioning the voids are coincident with the back plane ribs.

21. The apparatus of claim 20 further the steps of: covering the apparatus with a reaction injection molding material.

22. The method of claim 21 further comprising the step of: forming a molded cup on each end of the apparatus for receiving a hydrophone cable.

23. The apparatus of claim 22 further comprising the step of: winding a plurality of hydrophones physically attached end to end and helically around a primary cable.

24. The method of claim 23 further comprising the step of: attaching the plurality of hydrophones to the primary cable at a single attachment point.

* * * * *